United States Patent
Ma et al.

(10) Patent No.: US 12,337,516 B2
(45) Date of Patent: Jun. 24, 2025

(54) METHOD OF MANUFACTURING BATTERY CELL COVER AND THE BATTERY COVER THEREOF

(71) Applicant: DAE SAN ELECTRONICS CO., LTD., Hwaseong-si (KR)

(72) Inventors: Sangyoung Ma, Ansan-si (KR); Un Eog Yeo, Ansan-si (KR)

(73) Assignee: DAE SAN ELECTRONICS CO., LTD., Hwaseong-si (KR)

( * ) Notice: Subject to any disclaimer, the term of this patent is extended or adjusted under 35 U.S.C. 154(b) by 99 days.

(21) Appl. No.: 17/787,338

(22) PCT Filed: Dec. 18, 2020

(86) PCT No.: PCT/KR2020/018720
§ 371 (c)(1),
(2) Date: Jun. 20, 2022

(87) PCT Pub. No.: WO2021/133004
PCT Pub. Date: Jul. 1, 2021

(65) Prior Publication Data
US 2023/0044948 A1 Feb. 9, 2023

(30) Foreign Application Priority Data

Dec. 27, 2019 (KR) .......... 10-2019-0176606
Oct. 7, 2020 (KR) .......... 10-2020-0129155

(51) Int. Cl.
*B29C 45/34* (2006.01)
*B29C 45/77* (2006.01)
*H01M 50/166* (2021.01)

(52) U.S. Cl.
CPC .......... *B29C 45/77* (2013.01); *H01M 50/166* (2021.01)

(58) Field of Classification Search
CPC .................. B29C 45/34; B29C 45/77; B29C 2945/76498
See application file for complete search history.

(56) References Cited

U.S. PATENT DOCUMENTS

2009/0224430 A1 9/2009 Chittle

FOREIGN PATENT DOCUMENTS

JP 3174953 B2 6/2001
JP 2007-160654 A 6/2007
(Continued)

OTHER PUBLICATIONS

International Search Report mailed Apr. 7, 2021 for International Application No. PCT/KR2020/018720 and its English translation.
(Continued)

*Primary Examiner* — James Sanders
(74) *Attorney, Agent, or Firm* — Insight Law Group, PLLC; Seung Lee (57) ABSTRACT

The present disclosure provides a method of manufacturing a battery cell cover coupled to a battery cell, the method including: injecting an injection-molded product into a mold at a predetermined injection pressure ($P_M$), discharging the gas or air within a cavity at a predetermined discharge pressure ($P_a$) with a predetermined time difference while the injection-molded product is filled in the cavity within the mold; and curing the injection-molded product filled within the mold and separating a cured product in which the injection-molded product is cured.

11 Claims, 9 Drawing Sheets

(56) References Cited

FOREIGN PATENT DOCUMENTS

| | | |
|---|---|---|
| JP | 2008-153181 A | 7/2008 |
| JP | 2009-274352 A | 11/2009 |
| KR | 10-2010-0126109 A | 12/2010 |
| KR | 10-1632149 B1 | 6/2016 |
| KR | 10-2017-0075797 A | 7/2017 |
| KR | 10-2018-0043665 A | 4/2018 |
| KR | 10-2437845 B1 | 8/2022 |

OTHER PUBLICATIONS

European Search Report dated Jan. 3, 2024 for European Application No. 20905354.5.
Fattori Jim, 'Part 1: Back to Basics on Mold Venting', Plastics Technology Online, Mar. 18, 2019, 1-7 pages, https://web.archive.org/web/20190927120749/https:www.ptonline.com/articles/part-1-back-to-basics-on-mold-venting.

METHOD OF MANUFACTURING BATTERY CELL COVER AND THE BATTERY COVER THEREOF

CROSS-REFERENCE TO RELATED APPLICATIONS

This application is a 371 national phase entry of International Application No. PCT/KR2020/018710, filed Dec. 18, 2020, which claims priority to and benefit of Korean Patent Application Nos. 10-2019-0176606 filed Dec. 27, 2019; and 10-2020-0129155 filed Oct. 7, 2020, the entire contents of which are incorporated herein by reference.

TECHNICAL FIELD

The present disclosure relates to a method of manufacturing a battery cell cover and a battery cell cover including the same.

BACKGROUND ART

As is well known, electric vehicles (EVs) mainly refers to a vehicle that obtains power by driving an AC or DC motor using the power of a battery, and a battery as a power source is essential in the electric vehicles.

Generally, the battery used in electric vehicles is modularized, and has the form in which an anode plate, a cathode plate, and a separator are installed inside a cell case, and a storage battery filled with an electrolyte is provided, and repeats an electrochemical action in which the battery is charged to a rated capacity by a generator and discharged due to an increased electricity consumption. As described above, since the battery is a key device in the electric vehicles, it is sealed with a cover to be protected from external impact and is maintained to have watertightness. In addition, a battery cell cover is also used for the purpose of avoiding the contact between cells and stacking the cells. The battery cell cover is made of a plastic material and is also manufactured through a molding die. Accordingly, there is a disadvantage in that it is difficult for the plastic injection material to spread evenly into a space inside the mold in order to manufacture a relatively thin battery cell cover. As a result, it is difficult to expect good quality molding results.

SUMMARY OF INVENTION

Technical Problem

The present disclosure has been made in efforts to solve the above problem, and an object of one embodiment of the present disclosure is to provide a thin-film battery cell cover applied to a battery module for an electric vehicle through a thin-film injection process manufactured through a mold that molds a plastic or synthesis resin injection-molded product.

Another object of one embodiment of the present disclosure is to provide a method of manufacturing a battery cell cover, which may provide a specific process condition when a thin-film battery cell cover is manufactured through an injection molding, thereby fundamentally preventing a defect such as burr and a non-molded portion from occurring.

In addition, still another object of one embodiment of the present disclosure is to provide a battery cell cover capable of reducing the weight of a battery cell cover coupled to a battery cell included in a battery module for an electric vehicle to reduce the volume and weight of the battery module for the electric vehicle.

In addition, yet another object of one embodiment of the present disclosure is to provide a thin-film battery cell cover manufactured by a mold that decompresses a space between an upper mold and a lower mold so that a plastic or synthesis resin injection-molded product is evenly filled into the space between the upper mold and the lower mold of the mold.

In addition, still yet another object of one embodiment of the present disclosure is to provide a battery cell cover manufactured by a mold capable of manufacturing a pair of battery cell covers by forming the molds to be symmetric to each other around an inlet.

In addition, further another object of one embodiment of the present disclosure is to provide a mold that decompresses a space between an upper mold and a lower mold so that a plastic or synthesis resin injection-molded product is evenly filled into the space between the upper mold and the lower mold of the mold.

In addition, further still another object of one embodiment of the present disclosure is to provide a mold that manufactures a pair of battery cell covers by forming the molds to be symmetric to each other around an inlet.

In addition, further yet another object of one embodiment of the present disclosure is to provide a method of decompressing a space between an upper mold and a lower mold so that a plastic or synthesis resin injection-molded product is evenly filled into the space between the upper mold and the lower mold of the mold.

In addition, further still yet another object of one embodiment of the present disclosure is to provide a method of manufacturing a pair of battery cell covers by forming molds to be symmetric to each other around an inlet.

Solution to Problem

According to the present disclosure, there may be provided a method of manufacturing a battery cell cover coupled to a battery cell,
the method including:
injecting an injection-molded product into a mold at a predetermined injection pressure ($P_M$);
discharging the gas or air within a cavity at a predetermined discharge pressure ($P_m$) with a predetermined time difference while the injection-molded product is filled in the cavity within the mold; and
curing the injection-molded product filled within the mold and
separating a cured product in which the injection-molded product is cured.

In one embodiment of the present disclosure, the gas or the air may be simultaneously or continuously removed.

In one embodiment of the present disclosure, the time difference in the process of injecting the injection-molded product and the process of discharging the gas or the air may be in a range of 0.01 to 0.05 seconds.

In one embodiment of the present disclosure, a time at which the gas or the air is discharged may be in a range of 0.25 to 0.35 seconds.

In one embodiment of the present disclosure, a pressure at which the injection-molded product is injected may have a range of 250 to 500 bar.

In one embodiment of the present disclosure, a pressure at which the gas or the air is discharged may have a range of 150 to 250 bar.

In one embodiment of the present disclosure, a filling velocity of the injection-molded product in the mold may be proportional to the injection pressure ($P_M$).

In one embodiment of the present disclosure, the discharge velocity (V) of the gas or the air may be proportional to the discharge pressure ($P_a$).

Here, in one embodiment of the present disclosure, the discharge velocity (V) may satisfy Equation 1 below, $$V = \kappa \frac{P_{m \cdot in} \cdot P_{a \cdot out}}{d} \quad \text{Equation 1}$$

V: Discharge velocity of gas or air
$P_{m \cdot in}$: Injection pressure within the mold
$P_{a \cdot out}$: Discharge pressure of gas or air
d: Discharge path diameter of the mold
k: Proportionality constant.

In one embodiment of the present disclosure, an injection amount (Q) of the injection-molded product may satisfy Equation below, $$Q = V \cdot f(d) \quad \text{Equation 2}$$

Q: Injection amount of the injection-molded product
V: Discharge velocity of gas or air
d: Discharge path diameter of the mold.

In one embodiment of the present disclosure, the method may further include discharging the gas or the air by a cutting process for at least a part of the injection-molded product before cured after the operation of discharging the gas or the air.

Meanwhile, the present disclosure may provide a battery cell cover manufactured by the method of manufacturing the battery cell cover.

In one embodiment of the present disclosure, a thin film thickness (t) of the battery cell cover may have a range of 0.15 to 0.2 mm.

Advantageous Effects of Invention

The method of manufacturing the battery cell cover and the battery cell cover including the same according to the present disclosure can provide the thin-film battery cell cover applied to the battery module for the electric vehicle through the thin-film injection process manufactured through the mold that molds the plastic or synthesis resin injection-molded product.

In addition, one embodiment of the present disclosure can provide the method of manufacturing the battery cell cover, which may provide the specific process condition when the thin-film battery cell cover is manufactured through the injection molding, thereby fundamentally preventing the defect such as burr and the non-molded portion from occurring.

In addition, one embodiment of the present disclosure can provide the battery cell cover capable of reducing the weight of the battery cell cover coupled to the battery cell included in the battery module for the electric vehicle to reduce the volume and weight of the battery module for the electric vehicle.

In addition, one embodiment of the present disclosure can provide the thin-film battery cell cover manufactured by the mold that decompresses the space between the upper mold and the lower mold so that the plastic or synthesis resin injection-molded product is evenly filled into the space between the upper mold and the lower mold of the mold.

In addition, one embodiment of the present disclosure can provide the battery cell cover manufactured by the mold capable of manufacturing the pair of battery cell covers by forming the molds to be symmetric to each other around the inlet.

In addition, one embodiment of the present disclosure can provide the mold that decompresses the space between the upper mold and the lower mold so that the plastic or synthesis resin injection-molded product is evenly filled into the space between the upper mold and the lower mold of the mold.

In addition, one embodiment of the present disclosure can provide the mold that manufactures the pair of battery cell covers by forming the molds to be symmetric to each other around the inlet.

In addition, one embodiment of the present disclosure can provide the method of decompressing the space between the upper mold and the lower mold so that the plastic or synthesis resin injection-molded product is evenly filled into the space between the upper mold and the lower mold of the mold.

In addition, one embodiment of the present disclosure can provide the method of manufacturing the pair of battery cell covers by forming molds to be symmetric to each other around the inlet.

DESCRIPTION OF EMBODIMENTS

Hereinafter, a method of manufacturing a battery cell cover according to the present disclosure and an embodiment of the battery cell cover including the same will be described in detail with reference to the accompanying drawings. In adding reference numerals to the components of each drawing, it should be noted that the same components are given the same reference numerals as much as possible even though they are indicated on different drawings. In addition, in describing the embodiment of the present disclosure, when it is determined that a detailed description of a related known configuration or function interferes with the understanding of the embodiment of the present disclosure, the detailed description thereof will be omitted.

In describing the components of the embodiment of the present disclosure, terms such as first, second, A, B, (a), and (b) may be used. These terms are only for distinguishing the components from other components, and the essence, sequence, or order of the components are not limited by the terms. In addition, unless otherwise defined, all terms used herein, including technical or scientific terms, have the same meaning as commonly understood by those skilled in the art to which the present disclosure pertains. Terms such as those defined in a commonly used dictionary should be interpreted as having a meaning consistent with the meaning in the context of the related art, and should not be interpreted in an ideal or excessively formal meaning unless explicitly defined in this application.

Figure 2:
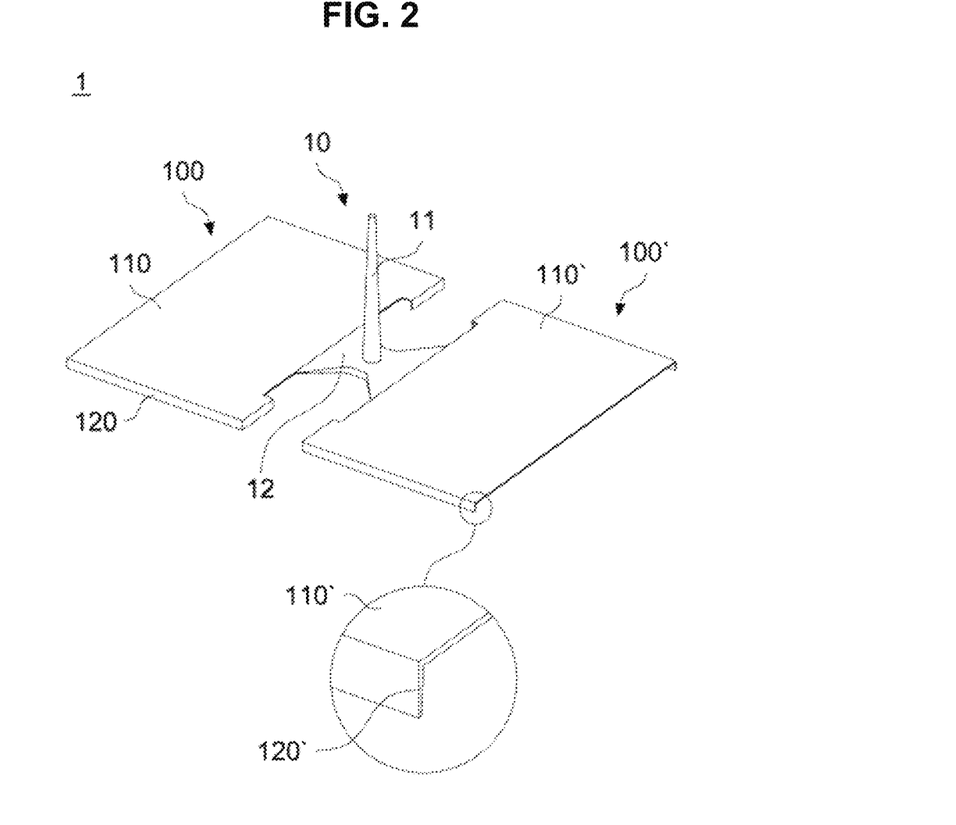
FIG. 2 is a perspective view showing a battery cell cover in an injection-molded product state according to one embodiment of the present disclosure.

FIG. 2 is a perspective view of a battery cell cover in an injection-molded product state according to one embodiment of the present disclosure. Here, the battery cell cover in the injection-molded product state means a cover injection-molded product 1 and specifies that it is a member different from a battery cell cover 100. Accordingly, the cover injection-molded product 1 is in an uncured liquid-state injection-molded product state, and the battery cell cover 100 may refer to a member partially cut to be used as the battery cell cover 100 after curing. However, hereinafter, the liquid state and the injection-molded product will be described separately based on the shape without distinction of the state after curing.

First referring to FIG. 2, the cover injection-molded product 1 may include the battery cell cover 100 and a cutout part 10. Here, the battery cell covers 100 and 100' may be positioned between batteries to prevent the direct contact between the batteries in a structure in which the batteries are stacked. Furthermore, areas of main covers 110 and 110', which are the main areas of the battery cell covers 100 and 100', may correspond to an area of the coupled surface of the batteries to be coupled for the coupling that may allow the battery cell covers to be positioned between the batteries. Accordingly, the battery cell covers 100 and 100' may be formed to have at least one surface bent from the end toward the battery. For example, when the battery cell covers 100 and 100' have a quadrangular shape as in the example of FIG. 2, bent portions 120 and 120' may be formed from parts of two surfaces and a part of one surface. In particular, since the bent portions 120 and 120' extend from the main covers 110 and 110' as an inclined surface, they may be formed to be thinner than other portions of the battery cell covers 100 and 100'. The inclined surface has a shape that is gradually narrowed in the extension direction, and may be formed as the thinnest portion of the battery cell covers 100 and 100'.

In addition, in the example of FIG. 2, in the manufacture of the battery cell covers 100 and 100', the two battery cell covers 100 and 100' may be formed by injecting an injection-molded product once. Of course, the number of manufacturing processes may be changed depending on the mold, and thus may be changed depending on the form changed by those skilled in the art and whether those skilled in the art changes the number of manufacturing processes, so that it goes without saying that the present disclosure is not limited to the example of FIG. 2.

Meanwhile, the cutout part 10 may include a first cutout part 11 and a second cutout part 12. The first cutout part 11 may be a part that is cured in a path in which the injection-molded product moves along an inlet of the mold when the injection-molded product is injected, and the second cutout part 12 may be a part that is cured in a section in which the injection-molded product is guided and moved toward the battery cell cover 100 through the inlet.

Accordingly, in FIG. 2, the first cutout part 11 may correspond to a length in the vertical direction of an upper mold when the inlet is formed at the upper mold of the upper and lower molds of the mold. Of course, when it is necessary to inject the injection-molded product to be inclined, the first cutout part 11 may correspond to an inclined length when the extension direction of the inlet formed at the upper mold is formed to be inclined.

In addition, the injection-molded product passing through the inlet may be moved to a space in which the battery cell cover 100 is to be formed by the second cutout part 12, and in the moving process, the movement direction of the injection-molded product may be guided by the mold. The content in which the injection-molded product is guided will be described in detail with reference to FIG. 2.

Figure 3:
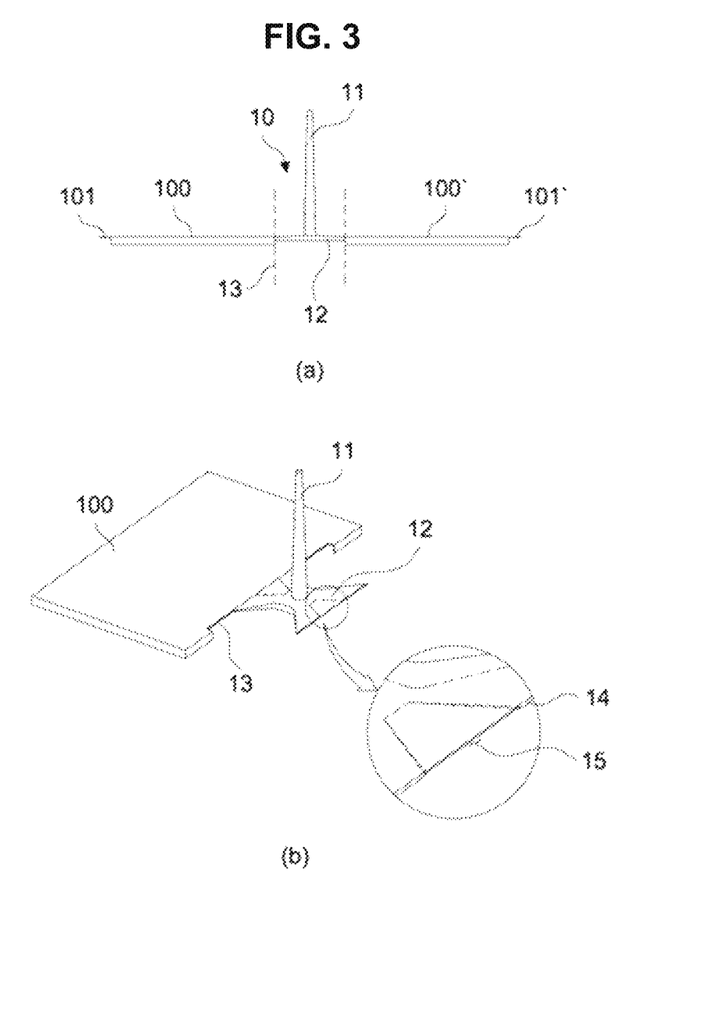
FIG. 3 illustrate a side view of the battery cell cover according to one embodiment of the present disclosure (a), and a cutout perspective view of the battery cell cover according to one embodiment of the present disclosure (b).

FIG. 3 is a side view and a cutout perspective view of the battery cell cover 100 according to one embodiment of the present disclosure, in which (a) of FIG. 3 is a side view of the battery cell cover 100 according to one embodiment of the present disclosure and (b) of FIG. 3 is a cutout perspective view of the battery cell cover 100 according to one embodiment of the present disclosure.

Referring to (a) of FIG. 3, the cover injection-molded product 1 may be divided into the battery cell cover 100 and the cutout part 10, and the two components may be divided and separated by a cutout line 13. The cutout line 13 means a point separated by a cutting means.

Through the cutting process, the battery cell cover 100 is manufactured, and in order for the shape of the battery cell cover 100 to have uniformity after the injection-molded product is cured, the injection-molded product is required to be fully filled in the mold. Here, the complete filling means that the injection-molded product is injected into an inner space of the mold formed by the upper and lower molds of the mold and fully filled, and in (a) and (b) of FIG. 3, the injection-molded product may be injected into the mold in which a suction hole may be formed for the full filling and sucked by a suction means toward an outlet.

The suction decompresses the inner space of the mold to induce the injection-molded product to be moved to the decompressed space, and through the suction, it is possible to overcome the disadvantage that it is difficult for the injection-molded product to move inside the narrow mold due to the viscosity of the liquid-state injection-molded product. In addition, it may be expected to shorten a molding time by promoting the movement. A part of the injection-molded product may be introduced into the suction hole formed in the mold by the above-described suction, and the introduced injection-molded product may be cured to appear in the form of suction parts 101 and 101'.

Furthermore, the suction parts 101 and 101' may be eliminated from the battery cell cover 100. Here, the elimination means that the injection-molded product may be cured and then removed from the mold, and the battery cell cover 100 and the cutout part 10 may be cutout by being included in the separating process in which the battery cell cover 100 and the cutout part are separated based on the cutout line 13. In other words, before the battery cell cover 100 is positioned between the batteries, the suction parts 101 and 101' may be removed from the battery cell cover 100.

Meanwhile, referring to (b) of FIG. 3, a direction in which the injection-molded product is guided in the mold to the battery cell cover 100 is shown in the second cutout part 12.

The second cutout part 12 includes a first guide part 14 and a second guide part 15 formed by guiding the injection-molded product. The first guide part 14 has a structure formed by a guide structure formed in the mold, and may extend in the direction of the battery cell cover 100 from a rear end of the inlet with respect to the flow of the injection-molded product. Here, the plurality of first guide parts 14 may extend in the direction of the battery cell cover 100 and may extend in a direction away from each other. In addition, the second guide part that has an interval at which the second guide parts move away from each other may be a groove part formed by a protruding guide structure in the mold. The liquid-state injection-molded product may preferentially flow toward the relatively lower first guide part 15.

In the flow, the injection-molded product enters in a state in which the position of the injection-molded product entering the battery cell cover 100 has moved away from each other at a predetermined interval, so that a distribution area of the injection-molded product may be increased, and the battery cell cover 100 may be formed through a process of injecting the injection-molded product into the area to be distributed more evenly.

Figure 4:
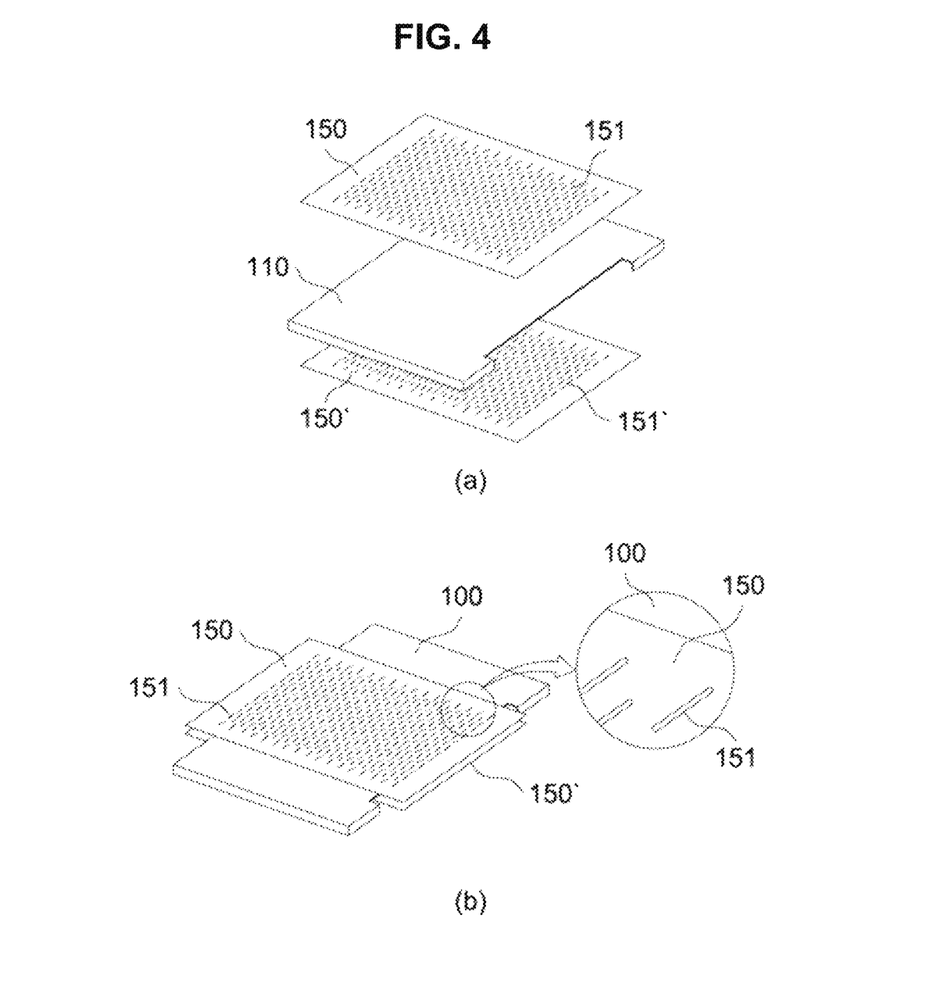
FIG. 4 illustrate an exploded perspective view of a battery cell cover including an adhesive film according to one embodiment of the present disclosure (a), and a partially enlarged view of the battery cell cover with the adhesive film attached according to one embodiment of the present disclosure (b).

FIG. 4 is an exploded perspective view and an enlarged view of the battery cell cover 100 including adhesive films 150 and 150' according to one embodiment of the present disclosure, in which (a) of FIG. 4 is an exploded perspective view of the battery cell cover 100 including the adhesive films 150 and 150' according to one embodiment of the present disclosure, and (b) of FIG. 4 is a partially enlarged view of the battery cell covers 100 and 100' with the adhesive films 150 and 150' attached according to one embodiment of the present disclosure.

Referring to (a) and (b) of FIG. 4, the battery cell cover 100 may further include the adhesive films 150 and 150'. For example, when five or four battery cells are stacked to form one pack, the battery cell cover 100 may be positioned and bonded between the five or four battery cells. For the bonding at this time, the battery cell cover 100 may be coupled to the adhesive films 150 and 150' coated with an adhesive material. The adhesive films 150 and 150' may be bonded to the portion where the battery cells are stacked, that is, a surface of the main cover 110 of the battery cell cover 100.

Furthermore, in the adhesive films 150 and 150' that come into surface contact, air may be interposed between the adhesive surfaces, and in order to prevent this situation, the adhesive surfaces of the adhesive films 150 and 150' may be formed with apertures 151 and 151'. The air, which is likely to be interposed through the apertures 151 and 151', may be discharged to the outside through the apertures 151 and 151'. In other words, since the apertures 151 and 151' are formed, it can be expected to facilitate the storage of the battery case 100 including the adhesive films 150 and 150' and increase the adhesive force of the adhesive films 150 and 150'.

Figure 5:
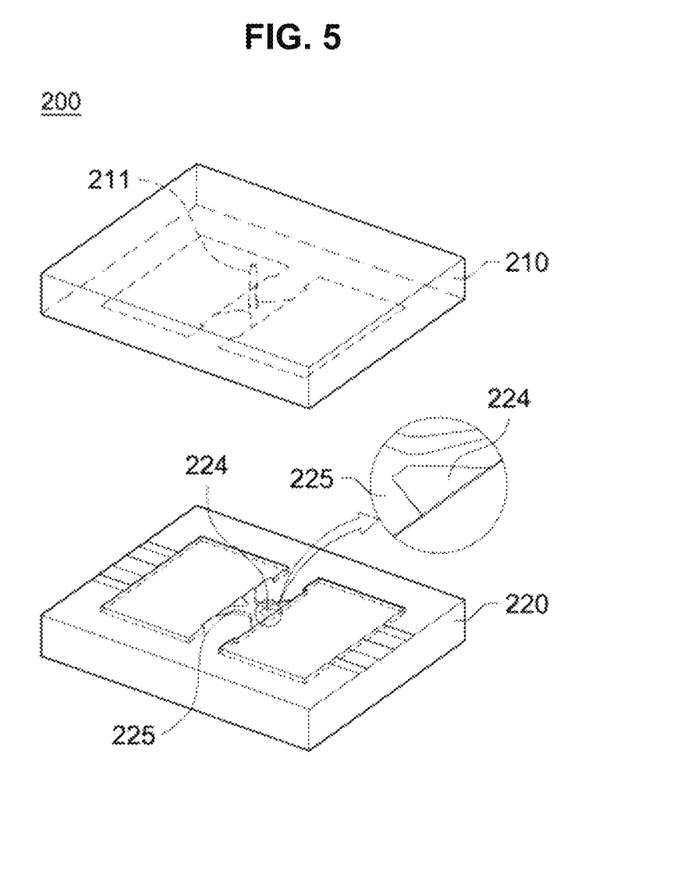
FIG. 5 is a perspective view of a mold according to one embodiment of the present disclosure.

FIG. 5 is a perspective view of a mold 200 according to one embodiment of the present disclosure.

Referring to FIG. 5, the mold 200 may include an upper mold 210 and a lower mold 220. The upper mold 210 may be formed by the inlet 211 through which the injection-molded product may be injected passing through the upper mold 210, and may include a pattern with a shape capable of molding an upper surface of the cover injection-molded product 1 formed after the injection-molded product is injected into the mold 200.

In addition, the lower mold 220 may be formed with a plurality of first injection-molded product guide parts 224, which are inclined parts to which the injection-molded product moving in a downward direction by its own weight and suction may be guided, and a second injection-molded product guide part 225 that separates the first injection-molded product guide part.

Here, the first injection-molded product guide part 224 may be formed to be engraved from the lower mold 220, and the injection-molded product cured at this point may form a part of the second cutout part 12. When the injection-molded product fills a cavity 201 inside the mold 200 from the second cutout part 12 toward the battery cell cover 100, in the example of FIG. 4, two first injection-molded product guide parts 224 formed in two different directions may achieve that the injection-molded product may be evenly injected in the cavity 201 of the mold 200 upon the filling.

For example, when the injection-molded product is injected toward the battery cell cover 100, the injection-molded product may be moved in a semicircular shape and filled, and the semi-circles are spaced apart by a predetermined distance and the injection-molded product is filled at a plurality of positions, so that the injection-molded product may be started to be filled in a larger area, thereby injecting the injection-molded product more evenly.

Figure 6:
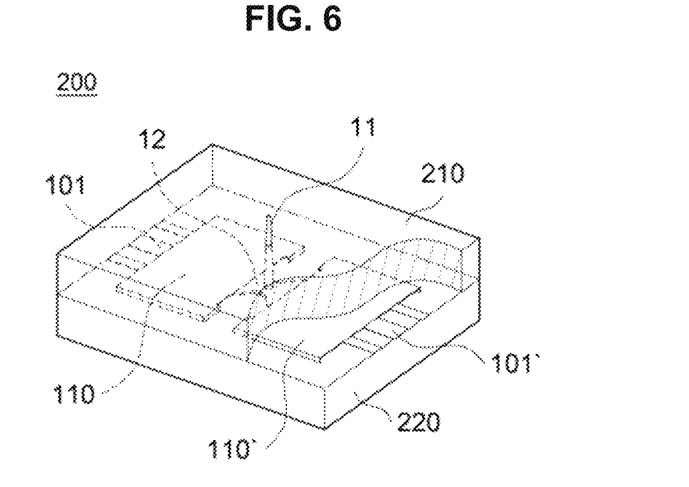
FIG. 6 is a cutout view of the mold according to one embodiment of the present disclosure.

FIG. 6 is a cutout view of the mold 200 according to one embodiment of the present disclosure.

Referring to FIG. 6, the battery cell cover 100 filled or cured inside the mold 200 may be identified by cutting a part of the upper mold 210 of the mold 200. In the example of FIG. 6, three outlets 250 are formed on one battery cell cover 100, and the suction parts 101 and 101' are formed in the outlet 250. The formation of the suction parts 100 and 101' in the outlet 250 may mean that the injection-molded product has been filled in the cavity 201 of the mold 200.

As described above, airtightness may be maintained when the injection-molded products of the upper mold 210 and the lower mold 220 come into contact with each other before being injected. In order to maintain the airtightness, a sealing member (not shown) may be included in at least one of the upper mold 210 and the lower mold 220 and positioned on surfaces coming into contact with each other. Of course, the sealing member may be supplied from the outside of the mold 200. For example, a contact line formed after the upper mold 210 and the lower mold 220 come into contact with each other may be sealed by an external sealing member to maintain airtightness.

Meanwhile, the thicknesses of the battery cell covers 100 and 100' manufactured through the above-described mold 200 may be 1 mm or less, for example, 0.2 to 0.7 mm. Preferably, the thicknesses of the battery cell covers 100 and 100' may be less than 0.3 mm. In this case, 0.2 mm may be the bent parts (120 and 120' in FIGS. 1 and 2), and 0.7 mm may be the main covers (110 and 110' in FIGS. 2 and 3). In addition, the bent part (120 and 120' in FIGS. 2 and 3) may be formed to have different thicknesses for each position unlike the main covers (110 and 110' in FIGS. 1 and 2). For example, the bent parts (120 and 120' in FIGS. 2 and 3) may be formed to have an inclined cross section that is formed to be thinner as they go away from the main covers (110 and 110' in FIGS. 2 and 3). Furthermore, the smaller the thickness, the more difficult the movement of the injection-molded product in the cavity 201 due to the viscosity of the injection-molded product, so that the injection-molded product may be sucked at a higher pressure.

Figure 1:
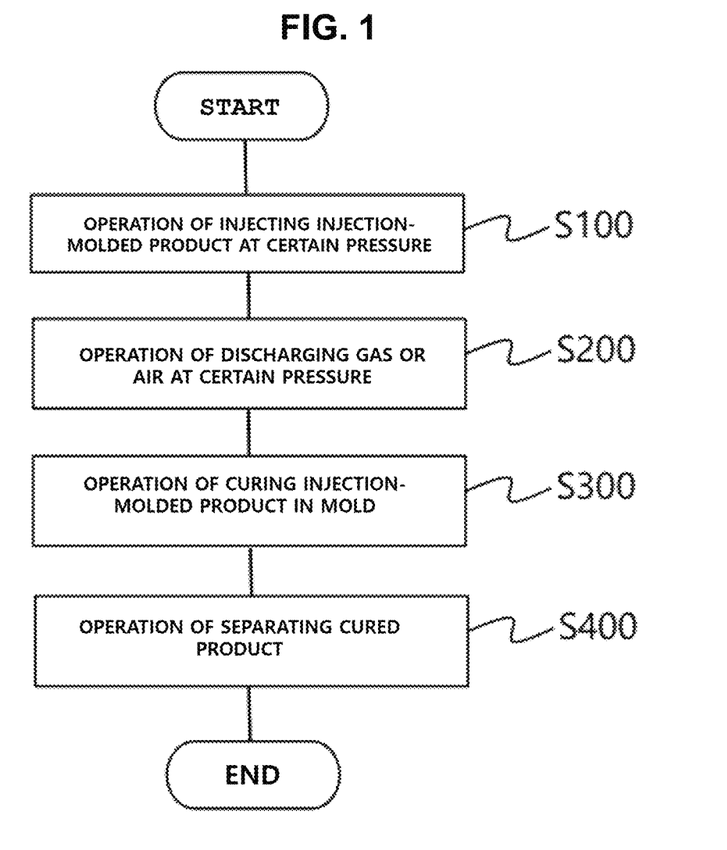
FIG. 1 is a flowchart showing a method of manufacturing a battery cell cover according to one embodiment of the present disclosure.
Figure 7:
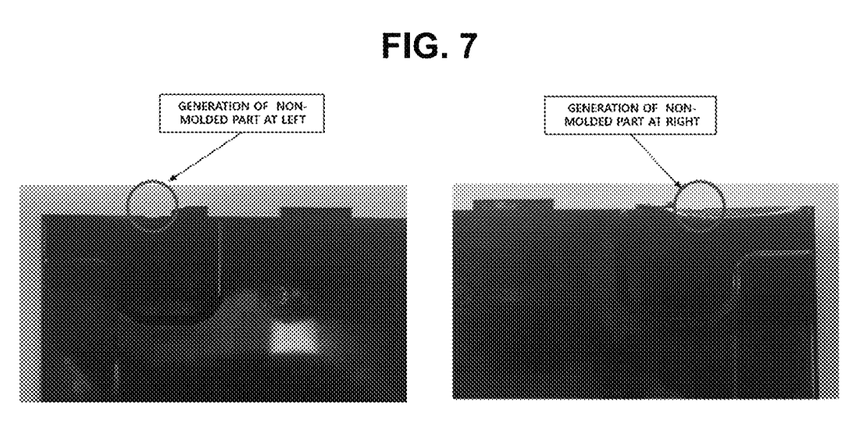
FIGS. 7 and 8 are pictures showing a comparison of the molded results of the battery cell cover according to one embodiment of the present disclosure.
Figure 8:
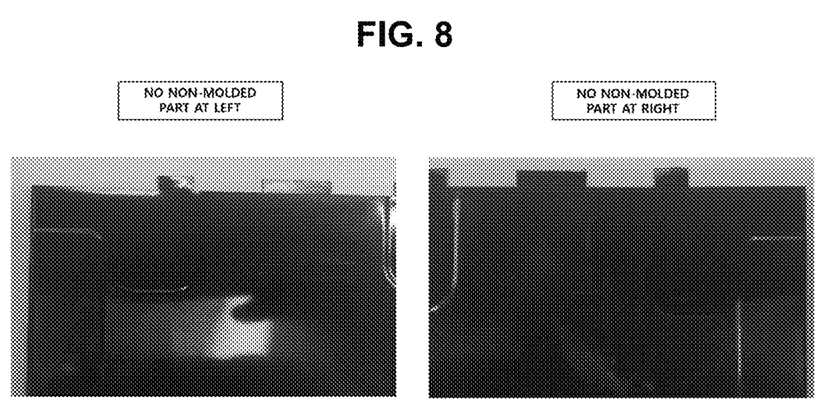

FIG. 1 is a flowchart showing a method of manufacturing the battery cell covers 100 and 100' according to one embodiment of the present disclosure, and FIGS. 7 and 8 are pictures showing the comparison of the molded results of the battery cell cover according to one embodiment of the present disclosure.

First, the mold 200 may be prepared. Here, the preparation includes the preparation of the sealing member described with reference to FIG. 6, as necessary. In addition, after the upper mold 210 and the lower mold 220 of the mold 200 come into contact with each other so that airtightness is maintained, the injection-molded product formed on the upper mold 210 may be injected (S100).

Here, since the cavity 201, which is the inner space of the mold 200, is in a state in which airtightness is maintained, the air inside the cavity 201 may not be discharged to the outside. Accordingly, the gas and/or the air is discharged to the outside of the mold 200 by the outlet 250 that may be formed on one or more of the upper mold 210 and the lower mold 220 (S200). Accordingly, the gas and/or air positioned in the cavity 201 may be discharged. In this process, since the cavity 201 may be decompressed, the injection-molded product may be injected into the mold 200 by the pressure difference. In particular, according to the present disclosure, the gas may be generated when the injection-molded product is injected into the mold 200, and the gas may be discharged simultaneously or continuously along with the air present in the mold 200.

According to the present disclosure, the operation of injecting the injection-molded product (S100) may be performed in a range in which the injection pressure for injecting the injection-molded product is about 250 to 500 bar. Preferably, the injection pressure may be 300 to 400 bar, more preferably, 380 bar. At this time, when the injection pressure exceeds 500 bar, burr or the like may occur in the final molded product, and the molding is not properly performed when the injection pressure is less than 260 bar, or the thickness of the final molded product may be partially increased due to the generation of bubbles caused by not discharging the gas and/or the air, so that the range may be suitable.

In addition, the operation of discharging the gas and/or the air (S200) may be performed in a range of about 0.01 to 0.05 seconds. Preferably, the operation of discharging the gas and/or the air (S200) may be performed for about 0.03 seconds. Furthermore, the process of discharging the gas and/or the air may be performed in a range of 150 to 250 bar for about 0.25 to 0.35 seconds, and preferably may be performed at 180 bar for 0.3 seconds. The best molding state may be guaranteed in the process delay time and the performance time range.

Figure 9:
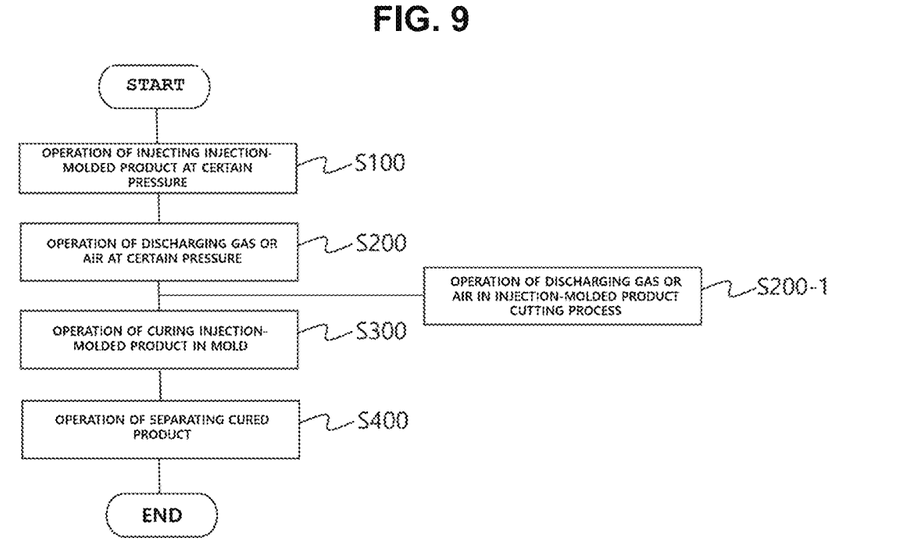
FIG. 9 is a flowchart showing a method of manufacturing the battery cell cover according to one embodiment of the present disclosure.

Furthermore, according to the present disclosure, as shown in FIG. 9, a process of performing a cutting treatment by a printing method (S200-1) may be performed after the operation of discharging the gas and/or the air (S200). In other words, bubbles may be generated in the curing process of the injection-molded product, and in this case, a defect rate may increase due to volume increase, or quality degradation of physical properties or the like may occur due to the presence of impurities in these bubbles, so that it is possible to fundamentally prevent the defect of the final molded product due to the generation of bubbles by the cutting treatment.

Thereafter, the injection-molded product may be cured when the injection process is completed and the cavity 201 is filled with the injection-molded product. The cured time may vary from several seconds to several hours depending on the temperature and the type of the injection-molded product (S300).

As described above, after the process of curing the injection-molded product is completed, the mold 200 is separated into the upper mold 210 and the lower mold 220 and removed, and the battery cell covers 100 and 100' to be manufactured may be cut from the cured injection-molded product. The battery cell covers 100 and 100' may be cut for separation from the cutout part (10 in FIG. 2), and cut along the cutout line 13 when a boundary line between the battery cell covers 100 and 100' and the cutout part (10 in FIG. 2) is called the cutout line 13. The cutting refers to the separation of the cutout part 10 and the battery cell covers 100 and 100' including the meaning of the cutting using a tool (S400).

The battery cell cover manufactured as described above may satisfy the following Equation 1. In other words, a discharge velocity (V) may be calculated according to an injection pressure value ($P_{m \cdot in}$) of the injection-molded product injected into the mold 200, a discharge pressure value ($P_{a \cdot out}$) of the gas and/or air discharged, and a discharge path diameter (d) of the mold 200, so that it is possible to set a target thickness (t) of the final molded product.

$$V = \kappa \frac{P_{m \cdot in} \cdot P_{a \cdot out}}{d} \qquad \text{Equation 1}$$

V: Discharge velocity of gas or air
$P_{m \cdot in}$: Injection pressure in the mold
$P_{a \cdot out}$: Discharge pressure of gas or air
d: Discharge path diameter of the mold
K: Proportional constant In other words, the discharge velocity (V) of the gas and/or the air is directly proportional to the injection pressure value ($P_{m \cdot in}$) of the injection-molded product and the discharge pressure value ($P_{a \cdot out}$) of the gas and/or air discharged, and inversely proportional to the discharge path diameter (d) of the mold 200. Accordingly, the injection pressure ($P_{m \cdot in}$), the discharge pressure ($P_{a \cdot out}$), and the discharge path diameter (d) of the mold 200 according to the above Equation 1 may be adjusted so that the desired thickness of the final molded product or the like may be manufactured, thereby manufacturing a battery cell cover having excellent quality.

In addition, the injection amount (Q) of the injection-molded product may be calculated through the following Equation 2 conversely according to the value of the discharge velocity (V) calculated as described above.

$$Q = V \cdot f(d) \qquad \text{Equation 2}$$

Q: Injection amount of the injection-molded product
V: Discharge velocity of gas or air
d: Discharge path diameter of the mold In other words, the initial injection amount (Q) of the injection-molded product may be determined by fixing the injection pressure ($P_{m \cdot in}$) and the discharge pressure ($P_{a \cdot out}$) to calculate the discharge velocity (V) of the gas and/or the air and then calculating a cross-sectional area (A) of the mold 200, that is, a function value (f(d)) of the discharge path diameter (d) of the mold 200. This injection amount (Q) may be proportional to the discharge velocity (V) and the cross-sectional area (A).

In this regard, in the present disclosure, the molded results were confirmed after the battery cell covers 100 and 100' were manufactured under the process conditions according to Table 1 below while satisfying the above-described conditions of Equations.

TABLE 1

|  | Injection pressure (P1)/bar | Discharge pressure (P2) | Discharge time (S) |
|---|---|---|---|
| Example 1 | 380 | 180 | 0.3 |
| Example 2 | 300 | 180 | 0.3 |
| Example 3 | 260 | 180 | 0.3 |
| Comparative Example 1 | 220 | 180 | 0.3 |
| Comparative Example 2 | 380 | 120 | 0.3 |
| Comparative Example 3 | 380 | 180 | 0.15 |

As shown in Table 1, in Comparative Example 1 in which the injection pressure is 220, Comparative Example 2 in which the discharge pressure of the gas or the air is 120, and Comparative Example 3 in which the discharge time is 0.15 seconds, as shown in FIG. 7, it may be confirmed that the non-molded part of the battery cell cover is generated.

In other words, it may be confirmed that the non-molded part was generated in the battery cell cover manufactured under the process conditions of the discharge pressures and discharge times in Comparative Examples 2 and 3 even with the same injection pressure as in Example 1, and the non-molded part was generated in the battery cell cover manufactured under the process conditions of the injection pressure in Comparative Example 1 even when the battery cell cover was manufactured under the process conditions having the same discharge pressure and discharge time as in Example 1. In particular, the thickness of the battery cell cover manufactured according to the preferred Example 1 of the present disclosure may be manufactured with the most excellent molding thickness in the range of about 0.15 to 0.2 mm.

In some cases, in addition to the size of the cross-sectional area of the discharge path of the mold through which the injection-molded product moves, the viscosity of the injection-molded product may also be adjusted. For example, the relationship between the viscosity of the injection-molded product itself or the viscosity of the injection-molded product and the thicknesses of the battery cell covers 100 and 100' to be manufactured may also be considered.

Although representative embodiments of the present disclosure have been described above in detail, those skilled in the art to which the present disclosure pertains will understand that the above-described embodiments may be variously modified without departing from the scope of the present disclosure. Accordingly, the scope of the present disclosure should not be limited to and defined by the described embodiments, and should be defined by not only the claims to be described later but also equivalents to the claims.

What is claimed is:

1. A method of manufacturing a battery cell cover coupled to a battery cell, the method comprising:

injecting an injection-molded product into a mold at a predetermined injection pressure (PM);

discharging the gas or air within a cavity in the mold at a predetermined discharge pressure (Pa) for a predetermined time while the injection-molded product is filled in the cavity within the mold; and curing the injection-molded product filled within the mold and separating a cured product in which the injection-molded product is cured.

2. The method of claim 1, wherein the gas or the air is simultaneously or continuously removed.

3. The method of claim 1, wherein the time is in a range of 0.01 to 0.05 seconds.

4. The method of claim 1, wherein the time is in a range of 0.25 to 0.35 seconds.

5. The method of claim 1, wherein a pressure at which the injection-molded product is injected has a range of 250 to 500 bar.

6. The method of claim 1, wherein a pressure at which the gas or the air is discharged has a range of 150 to 250 bar.

7. The method of claim 1, wherein a filling velocity of the injection-molded product is proportional to the injection pressure (PM).

8. The method of claim 1, wherein the discharge velocity (V) of the gas or the air is proportional to the discharge pressure (Pa).

9. The method of claim 8, wherein the discharge velocity (V) satisfies Equation 1 below, $$V = K \frac{P_{m \cdot in} \cdot P_{a \cdot out}}{d} \quad \text{Equation 1}$$

V: Discharge velocity of gas or air
+$P_{m \cdot in}$: Injection pressure within the mold
$P_{a \cdot out}$: Discharge pressure of gas or air
d: Discharge path diameter of the mold
K: Proportional constant.

10. The method of claim 1, wherein an injection amount (Q) of the injection-molded product satisfies Equation 2 below, $$Q = V \cdot f(d) \quad \text{Equation 2}$$

Q: Injection amount of the injection-molded product
V: Discharge velocity of gas or air
d: Discharge path diameter of the mold.

11. The method of claim 1, further comprising: a cutting process on at least a part of the injection-molded product before curing the injection-molded product after the operation of discharging the gas or the air.

* * * * *